United States Patent
Bernas, Jr. et al.

(10) Patent No.: US 12,103,463 B2
(45) Date of Patent: Oct. 1, 2024

(54) AIR TANK ASSEMBLY

(71) Applicant: International Truck Intellectual Property Company, LLC, Lisle, IL (US)

(72) Inventors: Robert Joseph Bernas, Jr., Wheaton, IL (US); Gregory Cameron, Naperville, IL (US); Tomasz J. Mrowca, Carol Stream, IL (US); Dustin A. White, Crystal Lake, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 669 days.

(21) Appl. No.: 17/361,668

(22) Filed: Jun. 29, 2021

(65) Prior Publication Data

US 2022/0410811 A1   Dec. 29, 2022

(51) Int. Cl.
| *B60R 11/00* | (2006.01) |
| *F17C 1/00* | (2006.01) |
| *F17C 13/08* | (2006.01) |

(52) U.S. Cl.
CPC .......... B60R 11/00 (2013.01); F17C 1/00 (2013.01); F17C 13/084 (2013.01); *B60R 2011/0029* (2013.01); *F17C 2221/031* (2013.01); *F17C 2270/0168* (2013.01)

(58) Field of Classification Search
CPC .... B60R 11/00; B60R 2011/0029; F17C 1/00; F17C 13/084; F17C 2221/031; F17C 2270/0168; F17C 2201/0104; F17C 2201/056; F17C 2205/0192; F17C 2223/0123; F17C 2223/035; F17C 2270/0171
See application file for complete search history.

(56) References Cited

U.S. PATENT DOCUMENTS

| 6,666,084 | B2 | 12/2003 | Schelhas et al. | |
| 7,259,383 | B2 | 8/2007 | Wirthlin | |
| 8,179,272 | B2 | 5/2012 | Clabaugh | |
| 8,585,004 | B1 * | 11/2013 | Roeglin | F16M 11/38 296/68.1 |
| 10,732,019 | B2 | 8/2020 | Boldt et al. | |
| 11,220,189 | B1 * | 1/2022 | Hogan | B60L 1/003 |
| 11,712,938 | B1 * | 8/2023 | Klein | B60G 9/00 280/86.5 |
| 2006/0244297 | A1 * | 11/2006 | Demski | B60N 2/885 297/391 |
| 2007/0007790 | A1 * | 1/2007 | Hahn | B60N 2/502 296/65.05 |
| 2007/0251159 | A1 * | 11/2007 | Wagner | E04H 9/145 52/19 |

(Continued)

*Primary Examiner* — Kevin Hurley
*Assistant Examiner* — Marlon A Arce
(74) *Attorney, Agent, or Firm* — Mark C. Bach; Umang Khanna

(57) ABSTRACT

An air tank assembly disposed within a cab of a vehicle having a floor and a seat for a vehicle occupant comprises a platform mounted to the floor of the cab of the vehicle. A base of the seat is mounted to the platform opposite to the floor of the cab of the vehicle. At least one tank providing storage for compressed air is located by the platform above the floor of the cab of the vehicle adjacent the base of the seat.

4 Claims, 3 Drawing Sheets

(56) References Cited

U.S. PATENT DOCUMENTS

| | | | | |
|---|---|---|---|---|
| 2009/0294139 | A1* | 12/2009 | Wilson | A62C 3/0292 |
| | | | | 169/24 |
| 2010/0327573 | A1 | 12/2010 | Burns | |
| 2013/0000997 | A1* | 1/2013 | Peng | B60L 58/26 |
| | | | | 180/65.6 |
| 2020/0317179 | A1* | 10/2020 | Fujimoto | B60T 11/26 |

* cited by examiner

AIR TANK ASSEMBLY

BACKGROUND

This disclosure relates generally to an air tank assembly integrated with a base of a seat for a vehicle occupant. More specifically, this disclosure relates to an air tank assembly disposed under a seat for a vehicle occupant within a cab of a vehicle.

Some vehicles, such as commercial trucks, buses and the like, use compressed air. Compressed air can be stored in an air tank on a vehicle. On some vehicles, an air tank is mounted to a vehicle frame rail, a battery box or other structure with sufficient integrity to support the air tank during operation of the vehicle. An air tank mounted this way is outside of a cab of a vehicle. An air tank mounted outside a cab of a vehicle is difficult for an operator of the vehicle to access, especially when operating the vehicle, because the operator often is inside the cab of the vehicle.

It is desirable to have an air tank that is accessible by a vehicle operator inside a cab of a vehicle.

SUMMARY

This disclosure relates to an air tank assembly for a vehicle. One embodiment of the air tank assembly is disposed within a cab of a vehicle having a floor and a seat for a vehicle occupant. The air tank assembly comprises a platform mounted to the floor of the cab of the vehicle. A base of the seat is mounted to the platform opposite to the floor of the cab of the vehicle. At least one tank providing storage for compressed air is located by the platform above the floor of the cab of the vehicle adjacent the base of the seat.

DETAILED DESCRIPTION

Figure 1:
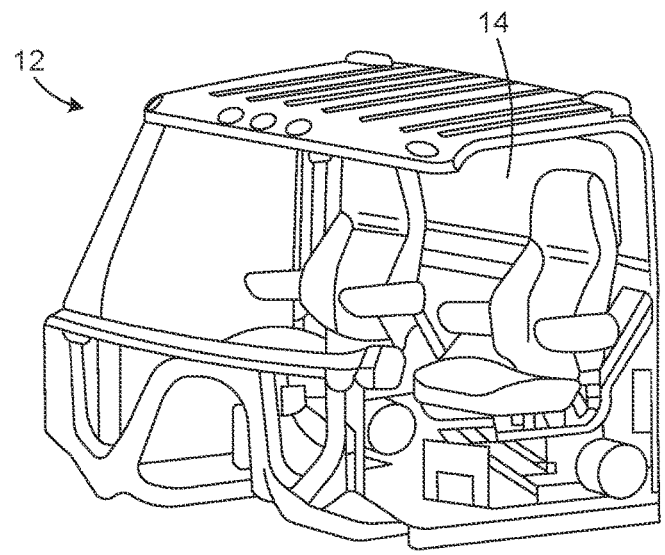
FIG. 1 is a perspective view of a portion of a cab of a vehicle having an air tank assembly described in this disclosure.

As shown in FIG. 1, this disclosure describes an embodiment of an air tank assembly 10 disposed within a cab 12 of a vehicle. More specifically, this disclosure describes an embodiment of an air tank assembly 10 located under a seat 14 in a cab 12 of a vehicle. Embodiments described herein may be used in any vehicle that benefits from compressed air storage. Compressed air storage is provided by at least one tank 16, two at least one tank 16A, i.e. a first tank, and 16B, i.e. a second tank, being shown in the Figures, comprising the air tank assembly 10. In other embodiments, the air tank assembly 10 may comprise any desired number of at least one tank 16. Each one of the desired number of at least one tank 16 may have a different shape, structure, composition, pressure rating, valving and the like.

Figure 2:
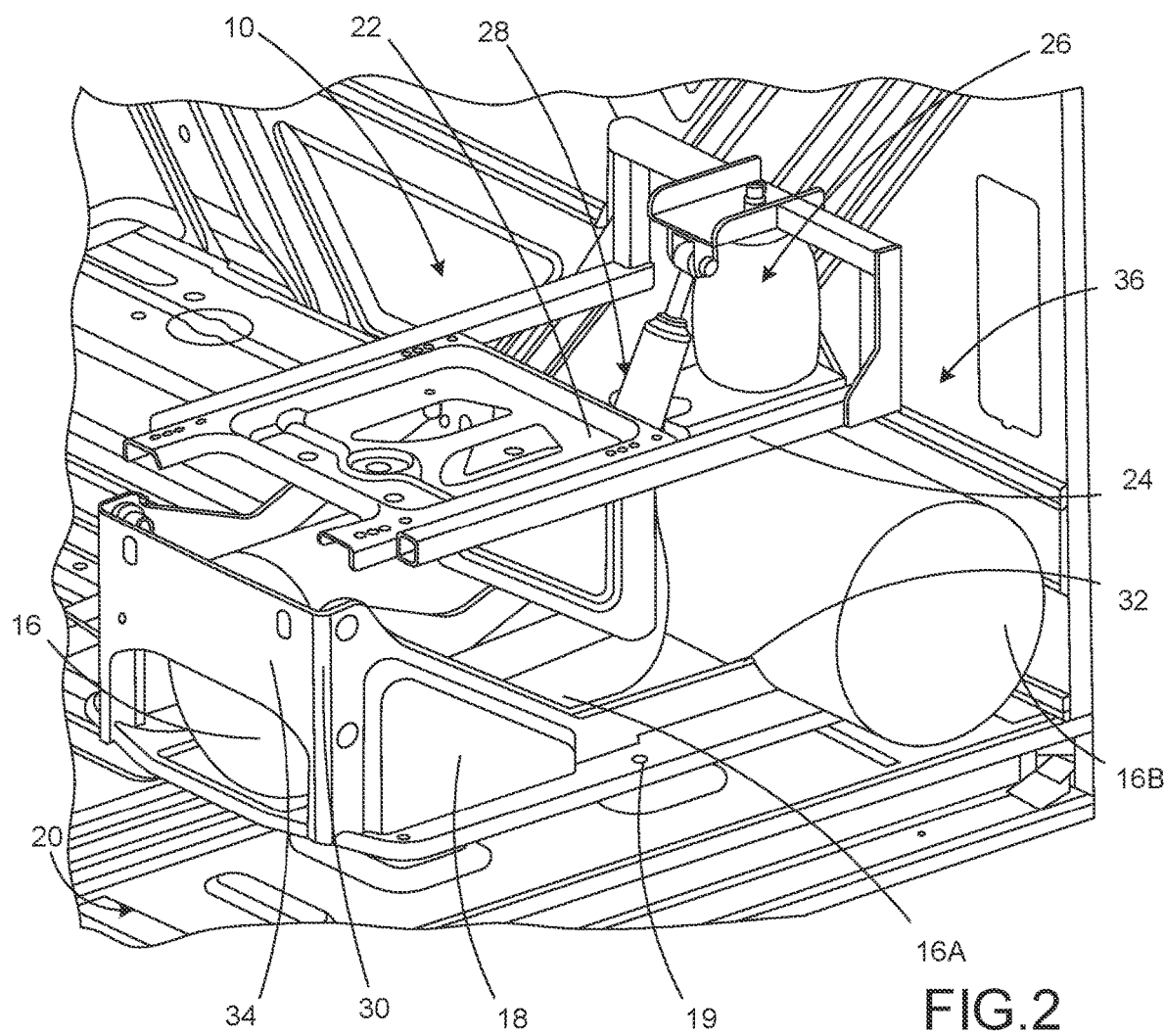
FIG. 2 is an enlarged perspective view of the air tank assembly shown in FIG. 1.
Figure 3:
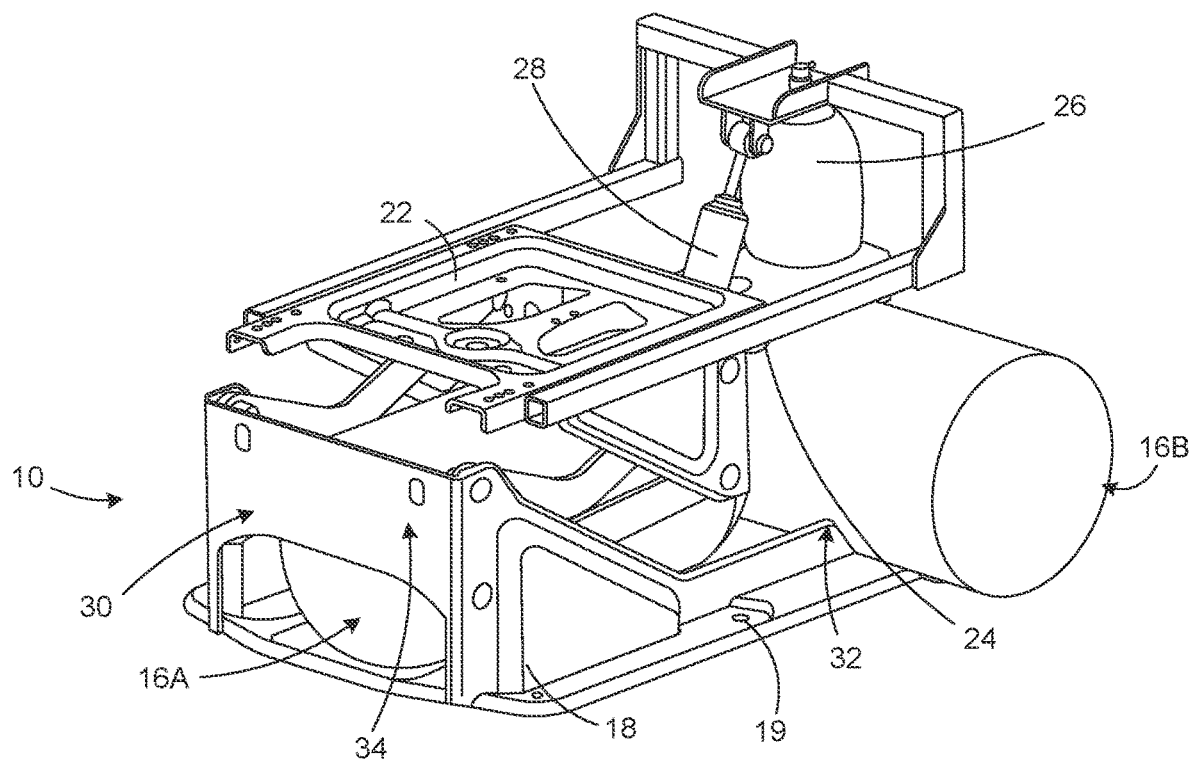
FIG. 3 is an enlarged perspective view of the air tank assembly described herein.

As shown clearly in FIGS. 2 and 3, the air tank assembly 10 comprises a platform 18 that is mounted by a suitable fastener 19, such as a bolt, a rivet and the like, to a floor 20 of the cab 12. While one fastener 19 is shown in FIG. 2, more than one fastener 19 can be used to mount the platform 18 to the floor 20 of the cab 12. An end of the platform 18 opposite to an end thereof mounted to the floor 20 of the cab 12 connects with a base 22 of the seat 14. In the United States, the base 22 and all appropriately related elements of the seat 14 comply with Federal Motor Vehicle Safety Standard (FMVSS) No. 207 and No. 210. The platform 18 locates the at least one tank 16 above the floor 20 of the cab 12 adjacent the base 22.

An arm 24, two arm 24 being shown in the Figures, extends alongside the base 22 and provides structure for mounting an air spring 26 and a damper 28. The air spring 26 and the damper 28 comprise a portion of suspension for the seat 14 thereby providing desired stiffness to the seat 14. Significantly, the air tank assembly 10 locates both the air spring 26 and the damper 28 behind the base 22 of the seat 14.

The platform 18 includes at least one feature 30 that locates at least one tank 16A and 16B. The at least one feature 30 may take any appropriate form, such as a strap, a clamp, a bracket and the like. In the embodiments shown in the Figures, the at least one feature 30 comprises a tab 32 and a member 34. The tab 32 engages a portion of the at least one tank 16B, i.e. the second tank, such that the at least one tank 16B is located between the tab 32 and a wall 36 comprising the cab 12. The member 34 engages an end 36 of the at least one tank 16A, i.e. the first tank, such that the at least one tank 16A is located between the member 34 and a portion of the at least one tank 16B. Depending on the embodiment, the at least one tank 16A and 16B may provide for air suspension of the seat 14, however, some embodiments may comprise static non-suspended seat 14.

Figure 4:
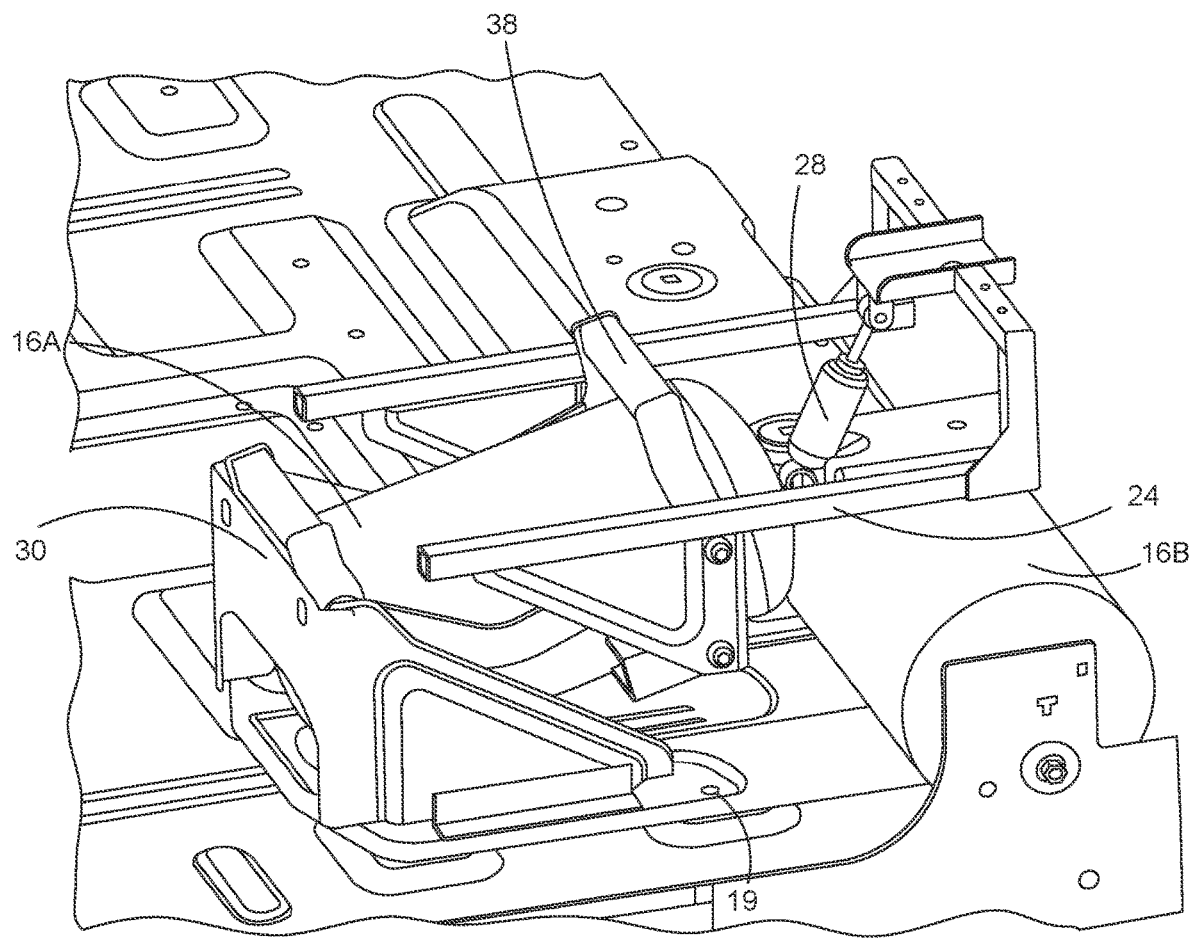
FIG. 4 is an enlarged perspective view of another embodiment of the air tank assembly described herein.

Another embodiment of the air tank assembly 10 is shown in FIG. 4. The embodiment of FIG. 4. is substantially similar to embodiments shown in FIGS. 1 through 3. However, whereas the at least one air tank 16A of FIG. 1 is substantially static, the at least one air tank 16A of FIG. 4 can move. Specifically, the at least one air tank 16A of FIG. 4 is limited in motion by connecting platform 18 to a section of the base 22 of the seat 14.

What is claimed is:

1. An air tank assembly disposed within a cab of a vehicle, the cab having a floor and a seat for a vehicle occupant, the air tank assembly comprising:
    a platform mounted to the floor of the cab of the vehicle;
    a base of the seat mounted to the platform opposite to the floor of the cab of the vehicle; and
    at least a first tank and a second tank providing storage for compressed air being located by the platform above the floor of the cab of the vehicle adjacent the base of the seat;
    a feature included on the platform locating the first tank and the second tank above the floor of the cab of the vehicle adjacent the base of the seat;
    wherein the feature comprises a member engaging the first tank such that the first tank is located between the member and a portion of the second tank.

2. The air tank assembly of claim 1 further comprising:
    at least one fastener mounting the platform to the floor of the cab of the vehicle.

3. The air tank assembly of claim 1 further comprising:
    an arm extending alongside the base of the seat;
    an air spring mounted to the arm behind the base of the seat; and
    a damper mounted to the arm behind the base of the seat.

4. The air tank assembly of claim 1 wherein the feature further comprises a tab engaging the second tank such that the second tank is located between the tab and a wall comprising the cab of the vehicle.

* * * * *